(12) United States Patent
Shimizu et al.

(10) Patent No.: US 7,121,472 B2
(45) Date of Patent: Oct. 17, 2006

(54) SEMICONDUCTOR INTEGRATED CIRCUIT, SEMICONDUCTOR INTEGRATED CIRCUIT MODULE AND INFORMATION APPARATUS

(75) Inventors: Hideo Shimizu, Kawasaki (JP); Kenji Kojima, Kawasaki (JP); Tatsuyuki Matsushita, Yokohama (JP); Yuuki Tomoeda, Yokohama (JP); Kentaro Umesawa, Yokohama (JP); Hideyuki Miyake, Yokohama (JP); Hiroshi Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 10/720,064

(22) Filed: Nov. 25, 2003

(65) Prior Publication Data
US 2004/0150468 A1  Aug. 5, 2004

(30) Foreign Application Priority Data
Dec. 25, 2002  (JP) .............................. 2002-373563

(51) Int. Cl.
*G06K 19/06* (2006.01)
(52) U.S. Cl. ...................................... 235/492; 235/487
(58) Field of Classification Search ................ 235/492, 235/487, 375, 493, 462.45, 462.46, 472
See application file for complete search history.

(56) References Cited

U.S. PATENT DOCUMENTS

| 4,275,405 A | | 6/1981 | Shannon | |
|---|---|---|---|---|
| 4,816,656 A | * | 3/1989 | Nakano et al. | ............. 235/380 |
| 5,182,442 A | * | 1/1993 | Takahira | ..................... 235/492 |
| 5,521,590 A | * | 5/1996 | Hanaoka et al. | ......... 340/10.51 |
| 5,760,644 A | | 6/1998 | Lancaster et al. | |
| 6,164,532 A | * | 12/2000 | Suga et al. | ................. 235/380 |

FOREIGN PATENT DOCUMENTS

| JP | 10-135882 | 5/1998 |
|---|---|---|
| JP | 10-189780 | 7/1998 |

\* cited by examiner

*Primary Examiner*—Daniel Stcyr
(74) *Attorney, Agent, or Firm*—Oblon, Spivak, McClelland, Maier & Neustadt, P.C.

(57) ABSTRACT

A semiconductor integrated circuit driven by an external power, comprises a change unit whose state changes with lapse of time without the external power, an output unit configured to output a signal in response to an instruction issued when the external power is supplied, the signal indicating a change of the state of the change unit, and an execution unit configured to execute a process in response to the signal. Therefore, the circuit is capable of utilizing time-point/time-period information even if they are not supplied with power.

25 Claims, 8 Drawing Sheets

FIG. 16 ized by ISO/IEC14443
SEMICONDUCTOR INTEGRATED CIRCUIT, SEMICONDUCTOR INTEGRATED CIRCUIT MODULE AND INFORMATION APPARATUS

CROSS-REFERENCE TO RELATED APPLICATIONS

This application is based upon and claims the benefit of priority from the prior Japanese Patent Application No. 2002-373563, filed Dec. 25, 2002, the entire contents of which are incorporated herein by reference.

BACKGROUND OF THE INVENTION

1. Field of the Invention

The present invention relates to a semiconductor integrated circuit, a semiconductor integrated circuit module and an information apparatus, which utilize information concerning a time period and point.

2. Description of the Related Art

Semiconductor integrated circuits for use in information apparatuses are driven by electric power. Most information apparatuses are connected to an AC power supply via a cable, or to a battery, and power is supplied therefrom to semiconductor integrated circuits incorporated in the apparatuses.

On the other hand, some information apparatuses acquire power from electromagnetic waves, utilizing electromagnetic induction. This power is supplied to the semiconductor circuits incorporated therein to operate them. In light of the physical conformation or use, these information apparatuses are suitable for radio tags, non-contact IC cards, etc. that cannot incorporate batteries.

Radio tags and non-contact IC cards are equipped with an IC chip and antenna and no batteries. They are operated by an electromotive force that results from electromagnetic induction based on Fleming's law. Non-contact IC cards are of the same shape as standard magnetic cash cards. On the other hand, radio tags have various shapes. Non-contact IC cards or radio tags, called "a adjacent/vicinity type", are accessible at a distance of approx. 1 m at maximum. Non-contact IC cards are standard (adjacent type) and ISO/IEC15693 (vicinity type). Most radio tags are based on these standards (see, for example, Jpn. Pat. Appln. KOKAI Publication No. 10-135882).

Typical systems utilizing such an information apparatus as the above are, for example, a shoplifting prevention system, in which a gate that generates electromagnetic waves is provided at the exit of a shop, and radio tags are attached to exhibited articles, or an automatic ticket gate system, in which automatic ticket checkers that generate electromagnetic waves are provided at ticket gates, and non-contact IC cards are used as commuter passes.

Information apparatuses utilizing electromagnetic induction by electromagnetic waves are not intended to always receive electromagnetic waves, but receive them only when necessary (only when they are used). In other words, the information apparatuses are not supplied with power when they are not used.

To control, for example, the period of use of an information apparatus that is supplied with power only when it is used, there were some methods, such as a method for managing the period of use at an apparatus that supplies electromagnetic waves, or a method for supplying time data together with electromagnetic waves to an information apparatus to enable it to use the time data. In both methods, the information apparatus depends on the power supply apparatus, which means that users of the power supply apparatus can illegally use the information apparatus by a simple modification of the power supply apparatus. Therefore, there is a need for a highly reliable semiconductor integrated circuit that enables information apparatuses to acquire correct time data used for control without depending on power supply apparatuses.

BRIEF SUMMARY OF THE INVENTION

The present invention has been developed in light of the above circumstances, and aims to provide a semiconductor integrated circuit, a semiconductor integrated circuit module and an information apparatus capable of utilizing time-point/time-period information even if they are not supplied with power.

According to a first aspect of the invention, there is provided a semiconductor integrated circuit driven by an external power, comprising: a change unit whose state changes with lapse of time without the external power; an output unit configured to output a signal in response to an instruction issued when the external power is supplied, the signal indicating a change of the state of the change unit; and an execution unit configured to execute a process in response to the signal.

According to a second aspect of the invention, there is provided a semiconductor integrated circuit module comprising:
a semiconductor integrated unit including:
a power supply which acquires a current from an antenna, and rectifies and smoothes a acquired current, and supplying, as a power, a rectified and smoothed current to an interior of the semiconductor integrated unit;
a change unit whose state changes with lapse of time without the power;
an output unit configured to output a signal in response to an instruction issued when the power supply supplies the power, the signal indicating a change of the state of the change unit; and
an execution unit configured to execute a process in response to the signal;
a sealing material which seals the semiconductor integrated unit; and
an antenna terminal which connects the power supply to the antenna, the antenna terminal being exposed on an outer surface of the sealing material.

According to a third aspect of the invention, there is provided an information apparatus comprising: an antenna which acquires a current induced by electromagnetic induction; a power supply connected to the antenna, the power supply acquiring a current, rectifying and smoothing the acquired current, and supplying, as a power, a rectified and smoothed current to an interior of the information apparatus; a change unit whose state changes with lapse of time without the power from the power supply; an output unit configured to output a signal in response to an instruction issued when the power supply supplies the power, the signal indicating a change of the state of the change unit; and an execution unit configured to execute a process in response to the signal.

DETAILED DESCRIPTION OF THE INVENTION

An embodiment of the invention will be described in detail with reference to the accompanying drawings.

Figure 1:
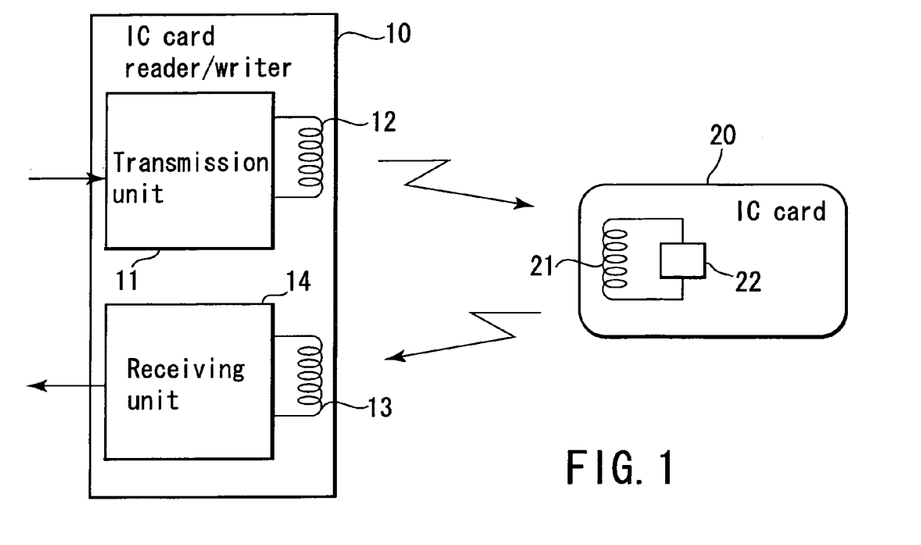
FIG. 1 illustrates the whole system for which an information apparatus according to an embodiment of the invention is used.

FIG. 1 shows the whole system to which an information apparatus according to an embodiment of the invention is applied. The information apparatus is, for example, a radio tag or non-contact IC card. In this text, only non-contact IC card examples will be described.

The system shown in FIG. 1 comprises an IC card reader/writer 10 connected to a server computer (not shown), and a non-contact IC card 20. When the non-contact IC card 20 is located close to the IC card reader/writer 10, a current is generated in the IC card 20 by electromagnetic induction, i.e., by electromagnetic waves supplied from the reader/writer 10. Thus, the non-contact IC card 20 is operable without a battery.

As shown in FIG. 1, the IC card reader/writer 10 comprises a transmission unit 11 for modulating a command transmitted superposed on electromagnetic waves, a transmission loop antenna 12 connected to the transmission unit 11 for generating, to the outside, electromagnetic waves with a command superposed thereon, a reception loop antenna 13 for receiving electromagnetic waves with data superposed thereon from the outside, and a receiving unit 14 for decoding the data superposed on the electromagnetic waves received by the reception loop antenna 13, and transferring the decoded data to a server.

The non-contact IC card 20 comprises a transmission/reception loop antenna 21 for receiving electromagnetic waves supplied from the transmission loop antenna 12 of the IC card reader/writer 10, and transmitting electromagnetic waves to the reception loop antenna 13, and an IC chip 22 connected to the transmission/reception loop antenna 21. The IC chip 22 will be described later in more detail.

Figure 2A:
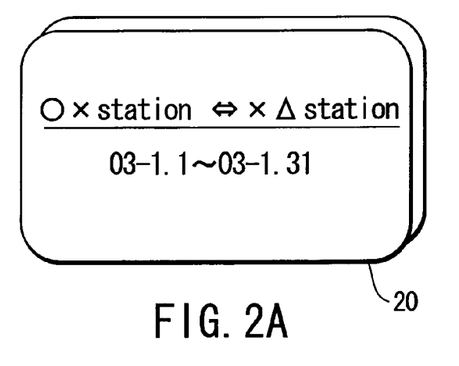
FIGS. 2A, 2B, 2C and 2D illustrate an example of a non-contact IC card 20.
Figure 2B:
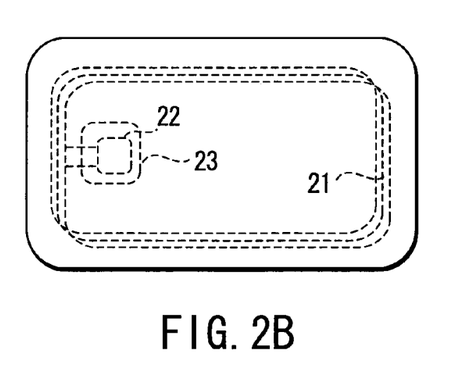
Figure 2C:
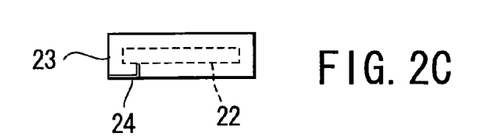
Figure 2D:
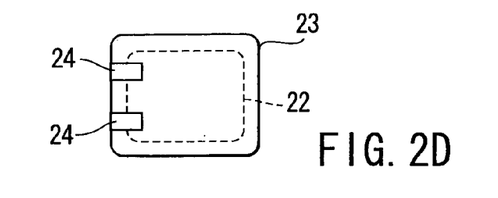

FIG. 2A shows the outward appearance of an example of the non-contact IC card 20, FIG. 2B shows the internal structure of the card, FIG. 2C is a side view of an IC module incorporated in the card, and FIG. 2D is a rear view of the IC module. The non-contact IC card 20 is generally a thin card. Therefore, the IC chip 22, which is obtained by forming a circuit block, described later, integral with a chip as one body, is sealed in a sealing material 23 (except for the lines led from the block and connected to the transmission/reception loop antenna 21), thereby providing an IC module protected from, for example, external forces. The lines connected to the transmission/reception loop antenna 21 extend from two contacts 24 exposed on the outer surface of the IC module.

Figure 3:
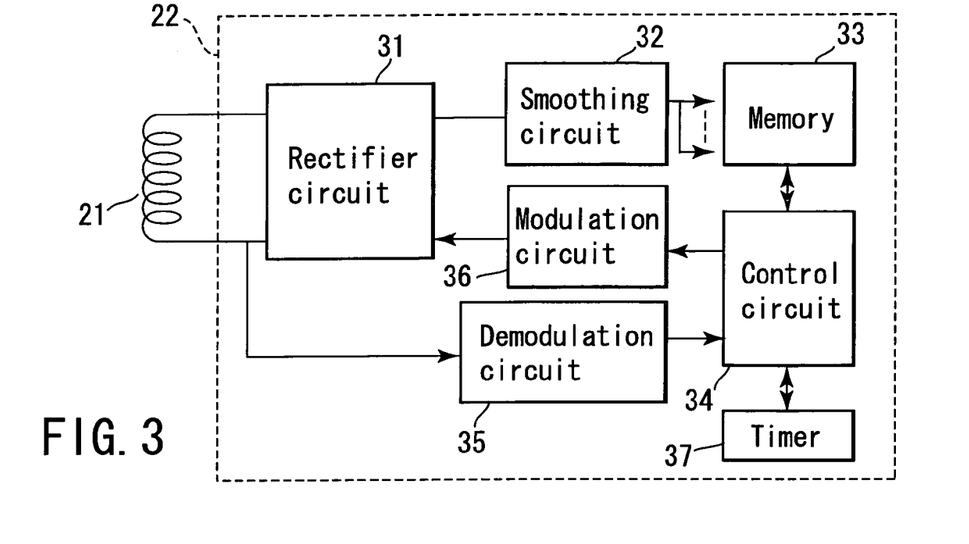
FIG. 3 is a block diagram illustrating the internal function blocks of an IC chip 22 incorporated in the IC card 20.

FIG. 3 is a block diagram illustrating the internal function blocks of the IC chip 22.

A rectifier circuit 31 rectifies the current generated by the transmission/reception loop antenna 21 when it receives electromagnetic waves. A smoothing circuit 32 smoothes the rectified current and supplies it to each element in the IC chip 22.

A demodulation circuit 35 receives and demodulates the current generated by the transmission/reception loop antenna 21, thereby acquiring the command supplied from the IC card reader/writer 10 and supplying it to a control circuit 34.

A modulation circuit 26 modulates the data output from the control circuit 34 to enable it to be superposed on electromagnetic waves and to be generated to the outside. The resultant current is supplied to the transmission/reception antenna 21, which, in turn, generates electromagnetic waves.

A memory 33 is a non-volatile semiconductor memory, EEPROM.

A timer 37 indicates whether or not a predetermined period of time has passed, and changes its state with lapse of time during time measurement without power. In other words, the timer changes its state even if the non-contact card 20 is sufficiently away from the IC card reader/writer 10 such that no current occurs.

The timer 37 will be described in detail.

Figure 4:
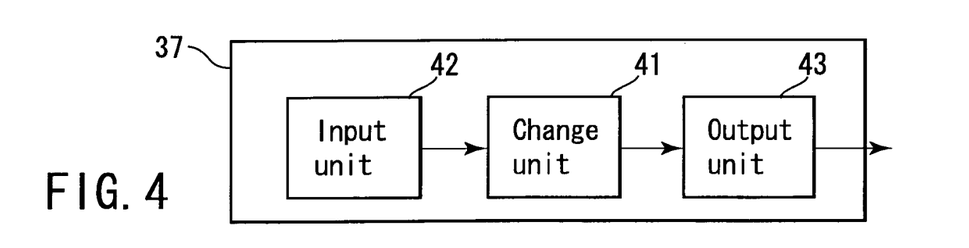
FIG. 4 is a block diagram illustrating the basic concept of a timer 37.

FIG. 4 illustrates the basic concept of the timer 37. The timer 37 comprises: a change unit 41, the state of which changes with lapse of time without a power supply such as a battery; an input unit 42 for inputting a input signal to the change unit 41; and an output unit 43 for outputting an output signal changed relative to the input signal in accordance with the state of the change unit 41. The state of the change unit 41 changes with lapse of time, and its changed state is used for measuring time. The input and output units 42 and 43 are used to confirm the state of the change unit 41.

Figure 5:
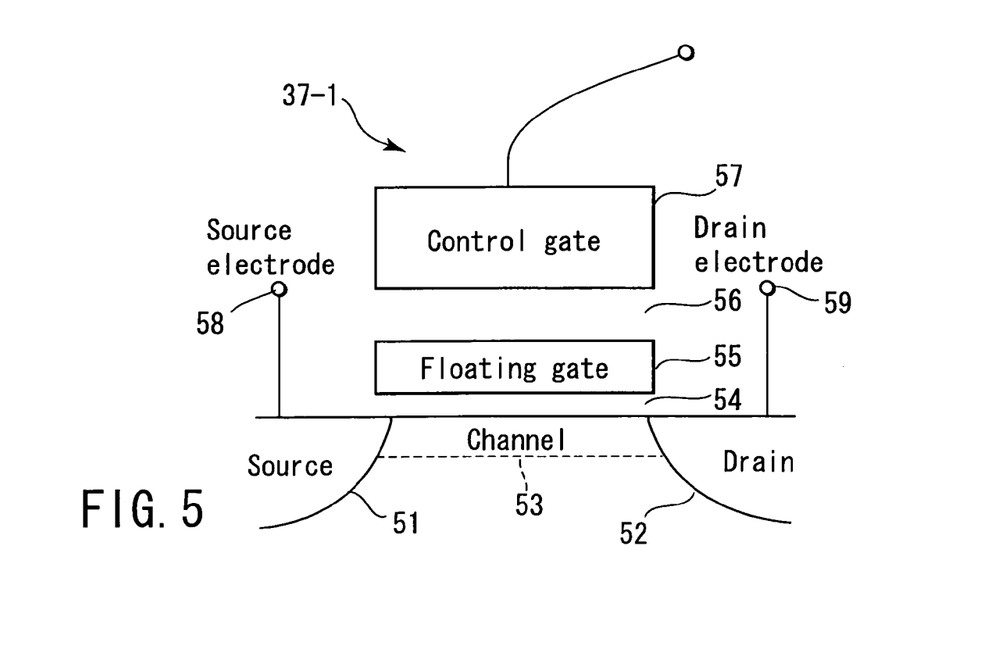
FIG. 5 shows a first example that realizes the basic concept of the timer 37.

FIG. 5 shows a first example 37-1 that realizes the basic concept of the timer 37.

The first timer example 37-1 comprises: a first layer having a source region 51, drain region 52 and channel region 53 therebetween; a second layer provided on the first layer and formed of a tunnel insulation film 54; a third layer provided on the second layer and formed of a floating gate 55; a fourth layer provided on the third layer and formed of an insulation film 56; and a fifth layer provided on the fourth layer and formed of a control gate 57. A source electrode 58 and drain electrode 59 are provided on the source and drain regions 51 and 52, respectively.

Figure 6:
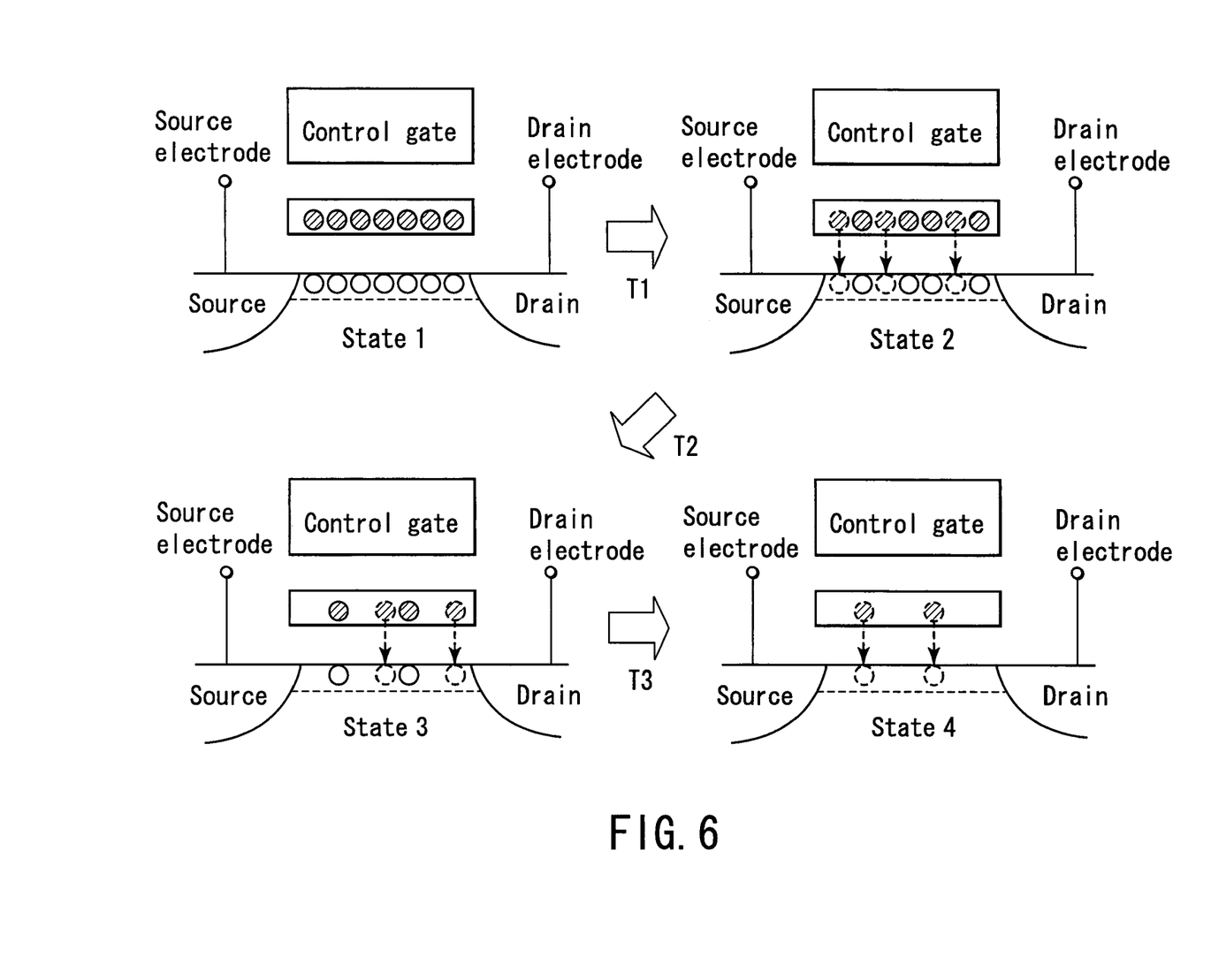
FIG. 6 illustrates changes with lapse of time in the state of a timer 37-1.

FIG. 6 illustrates changes with lapse of time in the state of the timer 37-1. In the figure, hatched circles indicate electrons, and white circles indicate positive holes.

State 1 is an initial state. In the timer 37-1, a pre-process is performed, in which the control gate 57 applies a high electric field between the substrate boundary of the channel region 53 and the floating gate 55, thereby injecting electrons from the channel into the floating gate 55 utilizing FN tunneling. At this time, positive holes gather at the substrate boundary of the channel region 53, whereby a channel is formed on the substrate boundary between the source and drain regions 51 and 52.

This pre-process may be performed when, for example, the semiconductor integrated circuit of the embodiment is manufactured, or when a device, such as a card, incorporating the semiconductor integrated circuit is issued or sold, or when the records in the device are updated. The device functions as an entrance ticket, commuter pass, one-day ticket or two-day limited express ticket. It is also assumed that the pre-process is performed periodically, for example, at 8 a.m. every day. Further, the pre-process may be performed when a product that contains the semiconductor integrated circuit requires maintenance work.

The electrons in the floating gate 55 gradually shift, by direct tunneling, to the substrate boundary, thereby reducing the level of the electric field at the substrate boundary in the channel region 53, compared to the state 1. State 2 is assumed at a time point $T_1$ a certain time period after the state 1. State 3 is assumed at a time point $T_2$ a certain time period after the state 2. Similarly, state 4 is assumed at a time point $T_3$ a certain time period after the state 3. The circles indicated by the broken lines represent the shift of electrons made due to direct tunneling by the respective time points. In the state 4 at the time point $T_3$, most electrons escape from the floating gate 55, therefore the channel at the substrate boundary of the channel region 53 disappears. As a result, no signals are output.

Figure 7:
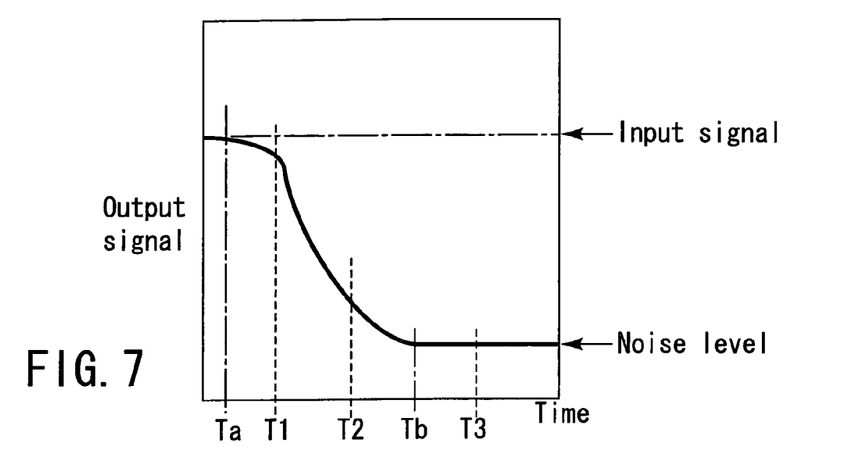
FIG. 7 is a graph illustrating the relationship between the time and the output signal of the timer 37-1.

FIG. 7 is a graph illustrating the relationship between the time and the output signal of the timer 37-1. Direct tunneling occurs between time points $T_a$ (=0) and $T_b$, and lastly, the channel disappears, whereby the level of the output signal is reduced to the noise level. Since the timer 37-1 supplies an output signal corresponding to a change in level between $T_a$ (=0) and $T_b$ (=the time when the output signal level reaches the noise level), the side for receiving the output signal can determine whether or not a predetermined time period has elapsed, or can determine a specific time point (e.g. $T_1$, $T_2$ or $T_3$ shown in FIG. 7) a predetermined time period after the initial state if the relationship between the state of the timer 37-1 and the level of the output signal is always clear. The time points $T_1$, $T_2$ and $T_3$ correspond to the states 2, 3 and 4 in FIG. 6.

Figure 8:
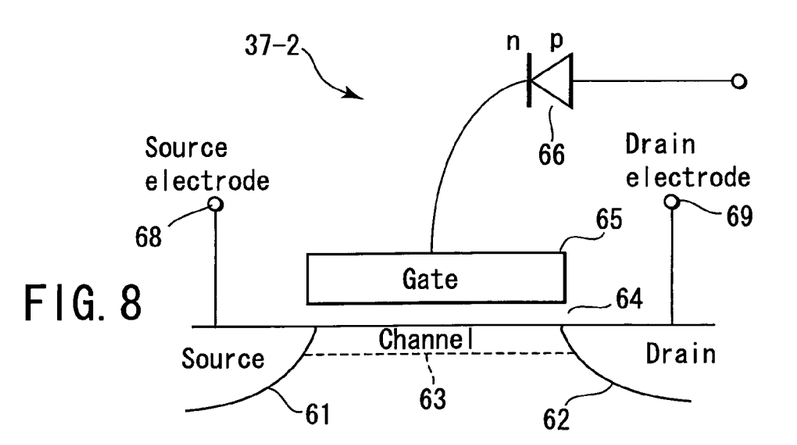
FIG. 8 is a second example that realizes the basic concept of the timer 37.

FIG. 8 is a second example 37-2 that realizes the basic concept of the timer 37 of FIG. 4. The timer 37-2 comprises: a first layer having a source region 61, drain region 62 and channel region 63 therebetween; a second layer provided on the first layer and formed of a tunnel insulation film 64; a third layer provided on the second layer and formed of a gate 65; and a PN junction provided on the third layer for controlling a leak current. A source electrode 68 and drain electrode 69 are provided on the source and drain regions 61 and 62, respectively.

The change in the state of the timer 37-2 with lapse of time is similar to that of the timer 37-1, although in the former, current leakage occurs in a PN junction, and in the latter, direct tunneling occurs. Therefore, no description is given of the change in the state of the timer 37-2 with lapse of time.

Figure 9:
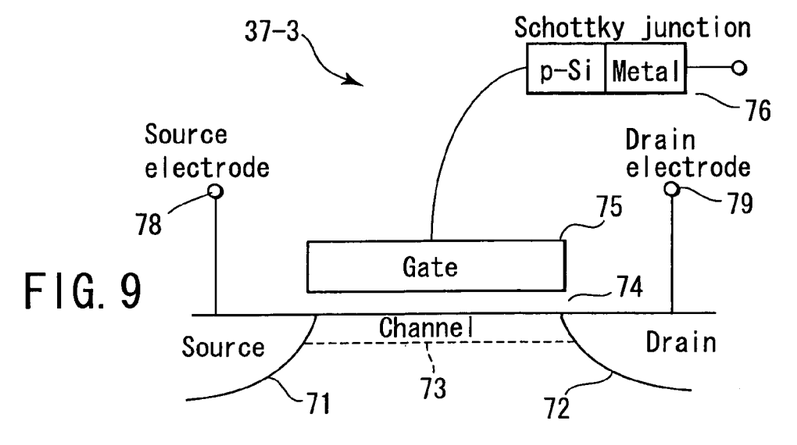
FIG. 9 is a third example that realizes the basic concept of the timer 37.

FIG. 9 is a third example 37-3 that realizes the basic concept of the timer 37 of FIG. 4. The timer 37-3 comprises: a first layer having a source region 71, drain region 72 and channel region 73 therebetween; a second layer provided on the first layer and formed of a tunnel insulation film 74; a third layer provided on the second layer and formed of a gate 75; and a Schottky junction 76 provided on the third layer for controlling a leak current. A source electrode 78 and drain electrode 79 are provided on the source and drain regions 71 and 72, respectively.

The change in the state of the timer 37-3 with lapse of time is similar to that of the timer 37-1, although in the former, current leakage occurs in a Schottky junction, and in the latter, direct tunneling occurs. Therefore, no description is given of the change in the state of the timer 37-3 with lapse of time.

As described above, a pre-process for forming a channel is needed before time measurement is started by the timer 37 (hereinafter, the timer 37 represents the timers 37-1, 37-2 and 37-3). If, however, anyone can perform the pre-process, a security risk arises. To avoid this, authentication to confirm as to whether or not the IC card reader/writer 10 is legal, which is often performed for standard IC cards, may be employed. In this case, only when the reader/writer 10 is determined to be legal, the pre-process is performed and time measurement is started.

Figure 10A:
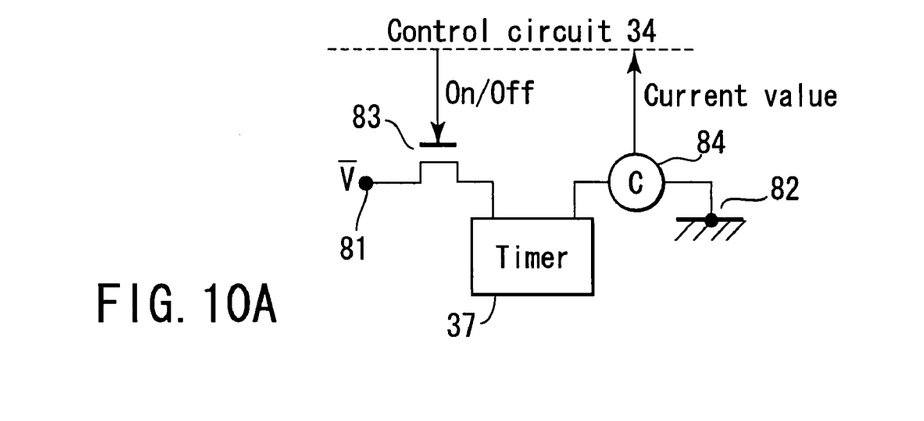
FIGS. 10A and 10B show connection examples of timer 37 and control circuit 34.
Figure 10B:
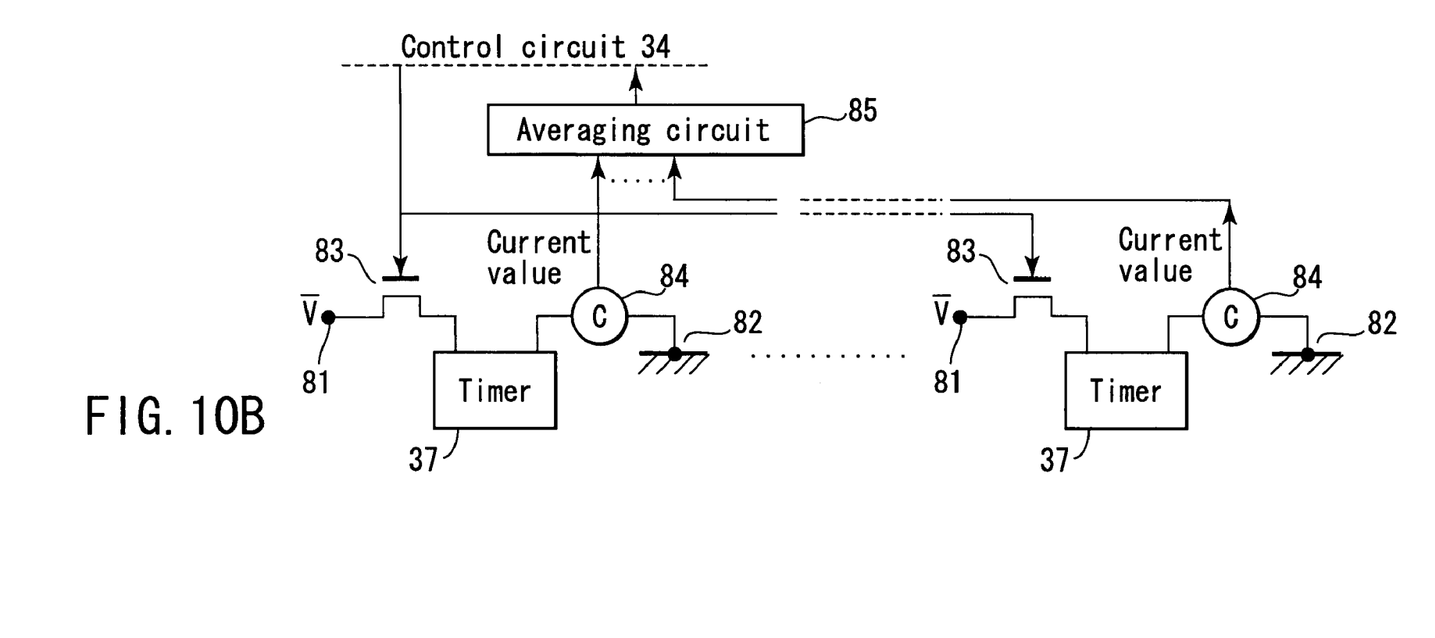

The above-described timer 37 is connected to the control circuit 34. FIGS. 10A and 10B show examples of connection of the timer 37 and circuit 34.

In the case of FIG. 10A, when the smoothing circuit 32 supplies power to the timer 37, a voltage occurs between the opposite ends of the timer 37. A power supply terminal 81 is connected to the source electrode 58, 68, 78 of the timer 37 via a switch element 83, while a GND terminal 82 is connected to the drain electrode 59, 69, 79 via an ampere meter 84.

The switch element 83 is connected to an ON/OFF (enable) signal line led from the control circuit 34, and is turned on when an ON signal is supplied. The ampere meter 84 is connected to output a current value to the control circuit 34.

When the control circuit 34 turns on the switch element 83 to confirm the state of the timer 37 during the operation of the IC chip 22, a predetermined voltage is applied between the power supply terminal 81 and GND terminal 82, whereby the ampere meter 84 measures the current flowing through the timer 37 and outputs the measurement result to the control circuit 34. As a result, the control circuit 34 detects the state of the timer 37.

In the above connection example, a single timer 37 is employed. However, a plurality of timers 37 may be employed. The change with lapse of time in the state of the change unit 41 of one timer 37 may be the same as or different from that of the change unit 41 of another timer 37, according to purpose. Referring now to FIG. 10B, a description will be given of the case where the timers 37 show the same change in state with lapse of time. In this example, a plurality of timers 37 similar to that shown in FIG. 10A are arranged parallel to each other, the current values output from them are input to an averaging circuit 85, and the averaged current is output from the circuit 85 to the control circuit 34. The ON/OFF (enable) signal line led from the control circuit 34 is connected to the respective switch elements 83 to make them be commonly controlled by the control circuit 34. In this example, even if the change units 41 of the timers 37 exhibit some different changes in state with lapse of time, their average value enables a stable timer to be realized. Further, if change units 41 that show different changes in state with lapse of time are employed (this case is not shown), various types of time information can be acquired, for example.

The control circuit 34 is connected to the demodulation circuit 35 to receive therefrom a demodulated command, and is also connected to the modulation circuit 36 to output thereto a process result based on the command. Further, the control circuit 34 is connected to the timer 37 as shown in the connection example. A command supplied to the control circuit 34 is, for example, a command to read an ID dedicated to the IC chip 22 (or IC card 20), from which the chip (or card) can be directly identified, or a command to write information, such as the name of a station from which a train or the like has been utilized.

Figure 11:
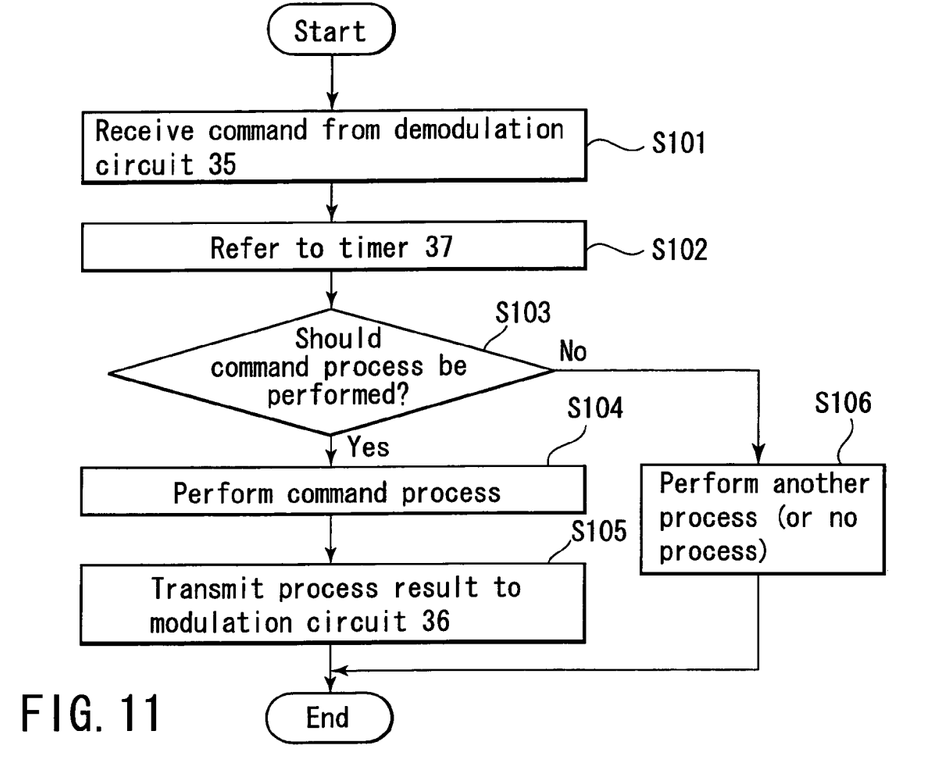
FIG. 11 is a schematic flowchart illustrating an operation of the control circuit 34.

The control circuit 34 incorporates a CPU, ROM and RAM, which are not shown. The CPU operates in accordance with a program prestored in the ROM, using the RAM as a work memory. Referring to FIG. 11, the operation of the control circuit 34 will be described roughly.

Firstly, the control circuit 34 receives a command from the demodulation circuit 35 (S101). Subsequently, the control circuit 34 refers to the timer 37 (S102). Concretely, an ON signal to input to the timer 37 to acquire a current value therefrom. The control circuit 34 determines from the current value whether or not the command should be processed (S103). The determination at the step S103 is, for example, as to whether or not the current value (level) is equal to (or less than) the noise level shown in FIG. 7. If the current level is equal to the noise level, this means that a predetermined time period has passed, while if it is higher than the noise level, it means that the predetermined time period ($T_b$ in FIG. 7) has not yet passed.

If it is determined that the command should be processed, the command is processed (S104). The control circuit 34 supplies the process result to the modulation circuit 36 (S105). If it is determined that the command should not be processed, another predetermined process (for example, a process for informing that the card has expired) is performed, or no process is performed (S106). The step S106 indicates that a desired process is not performed.

Figure 12:
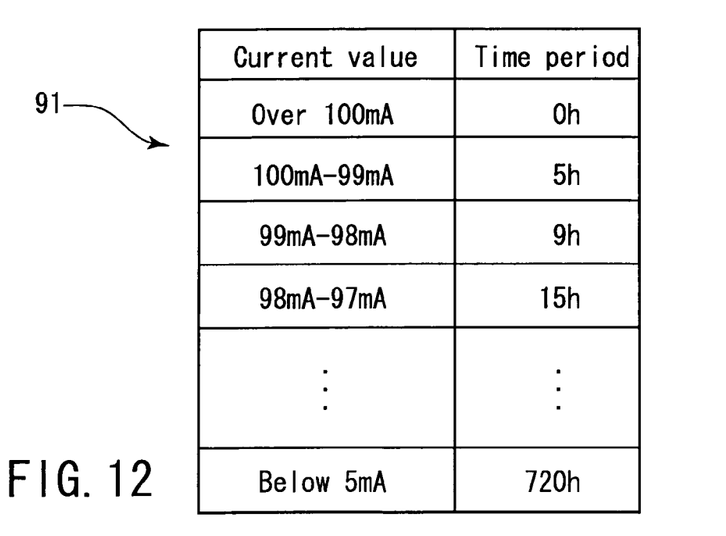
FIG. 12 illustrates a table 91.

The above-described operation of the control circuit 34 is just one example. In another example, described referring to FIG. 7, in which the relationship between the state of the timer 37 and the level of the output signal is clearly followed, the time period elapsing from the initial state can be acquired. Therefore, a command can be processed using time information. In this case, if a time information table 91 that stores current value (output signal level) ranges in relation to time information, as shown in FIG. 12, is held in the ROM of the control circuit 34, time information corresponding to each current value can be utilized for processing a command. This will be described in more detail with reference to the flowchart of FIG. 13.

Figure 13:
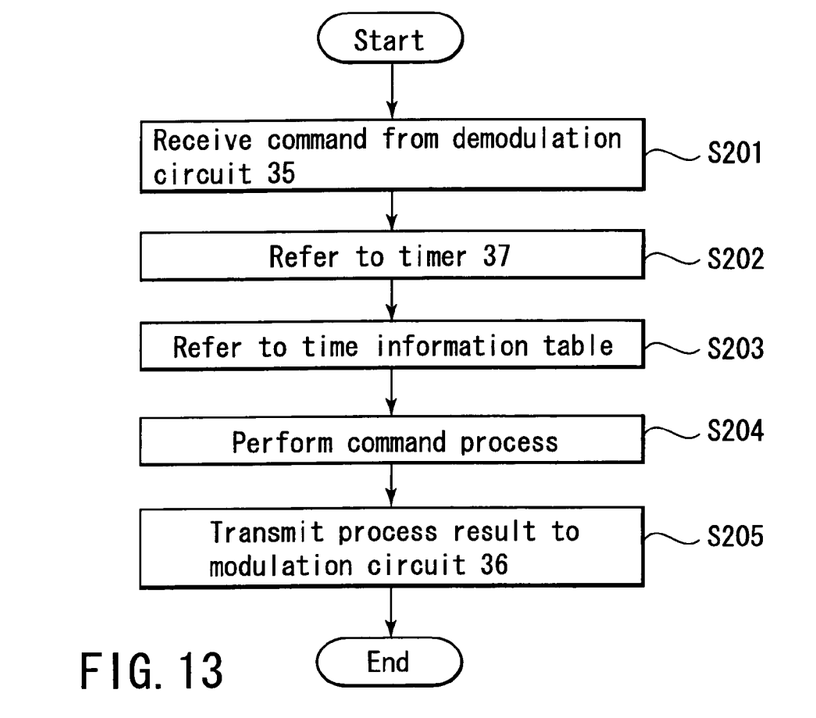
FIG. 13 is a schematic flowchart illustrating another operation of the control circuit 34.

Firstly, the control circuit 34 receives a command from the demodulation circuit 35 (S201). Subsequently, the control circuit 34 refers to the timer 37 to acquire a current value (S202). After that, the control circuit 34 acquires time data corresponding to the acquired current value, from the time information table 91 in the ROM (S203). In accordance with the program stored in the RAM, the control circuit 34 processes the command supplied from the demodulation circuit 35 (S204). This process is assumed to include a process utilizing the acquired time data. The control circuit 34 transmits the process result to the modulation circuit 36 (S205).

If the control circuit 34 is made to operate as described above, it can utilize time data. Although the embodiment utilizes the time information table 91 to acquire time data, the embodiment of the invention is not limited to this. For example, a function f(c) may be stored, which uses, as a variable, a current value (c) that varies as shown in the graph of FIG. 7, thereby acquiring time data by calculation using the function f(c).

Further, although in the embodiment, attention has been paid to the use of only time information, the flowcharts of FIGS. 11 and 13 may be combined so that both term and time information can be used for command processing.

As described above in detail, if the IC chip 22 of the embodiment is applied to, for example, a non-contact IC card or radio tag that cannot always be supplied with power, it performs command processing when it is supplied with power, and the timer employed in the chip continues to change its state until a predetermined time period passes even when the chip is supplied with no power. On the basis of the time data obtained from the timer and indicative of a predetermined elapsed time period, a determination as to whether or not command processing should be performed, or other data processes can be performed, is made. In other words, the embodiment of the invention can provide an IC chip that incorporates a semiconductor capable of measuring time even if no power is supplied thereto, and capable of using the measured time-period/time-point when power is supplied. The IC chip with the timer function does not need a power supply line or GND line to be connected to an external power supply, therefore can be provided in the form of a sealed module with only an antenna contact exposed to the outside, like the conventional non-contact IC cards that do not need batteries.

A modification of the IC chip 22 will now be described.

Figure 14:
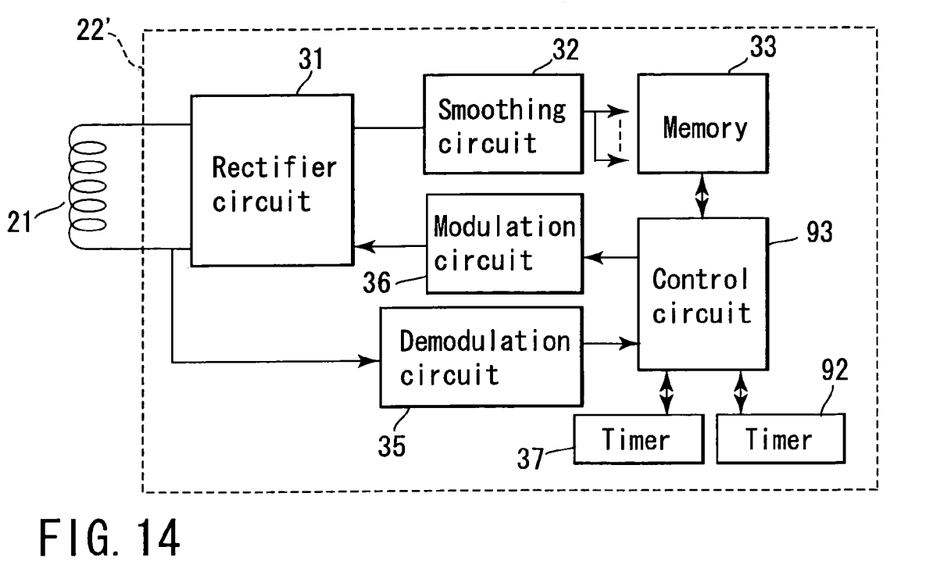
FIG. 14 is a block diagram illustrating the functions of an IC chip 22' that is a modification of the IC chip 22.

FIG. 14 is a block diagram illustrating the functions of an IC chip 22' that is a modification of the IC chip 22. The IC chip 22' differs from the above-described IC chip 22 in that the former incorporates a timer 92 as well as the timer 37. The timer 92 has the same structure as the timer 37 but shows different changes in state with lapse of time. Different changes in state with lapse of time can be realized by, for example, modifying the first example of FIG. 5 such that the degree of tunneling in the tunnel insulation film 54 is different from that in the first example, or such that the number of electrons accumulated in the floating gate 55 in the initial state is different.

A control circuit 93 incorporated in the IC chip 22' additionally incorporates a connection unit used to refer to the timer 92, and two timers similar to that shown in FIG. 10A are employed. These points differ from the IC chip 22. In addition, the program stored in the ROM is changed.

Figure 15:
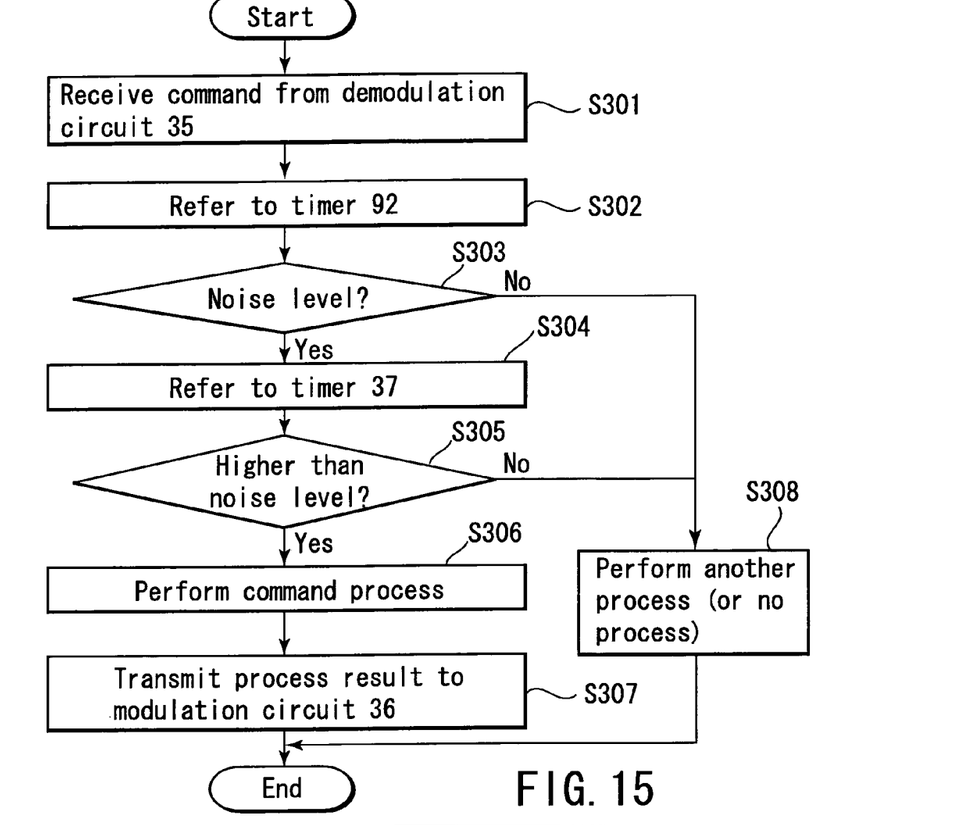
FIG. 15 is a schematic flowchart illustrating another operation of a control circuit 93.

Specifically, the program is changed to perform more accurate time control using the two timers 37 and 92. FIG. 15 illustrates another operation of the control circuit 93 based on the changed program. In the following description, it is assumed that the timer 92 reaches the noise level much earlier than the timer 37, and term information is utilized instead of time-point information.

Firstly, the control circuit 93 receives a command from the demodulation circuit 35 (S301). Subsequently, the control circuit 93 refers to the timer 92 (S302). The control circuit 93 determines whether or not the current value acquired from the timer 92 is equal to (or less than) the noise level (S303). If the current level is equal to the noise level, the control circuit 93 refers to the timer 37 (S304). The control circuit 93 determines whether or not the current value acquired from the timer 37 is equal to (or less than) the noise level (S305). If the current level is higher than the noise level, the control circuit 93 processes the command (S306), and outputs the process result to the modulation circuit 36 (S307).

If it is determined at the step S303 that the current level is higher than the noise level, or if it is determined at the step S305 that the current level is equal to or less than the noise level, it is determined that the command-processing allowable term of the card is exceeded, with the result that another predetermined process (for example, a process for informing that the card has expired) is performed, or no process is performed (S308).

Figure 16:
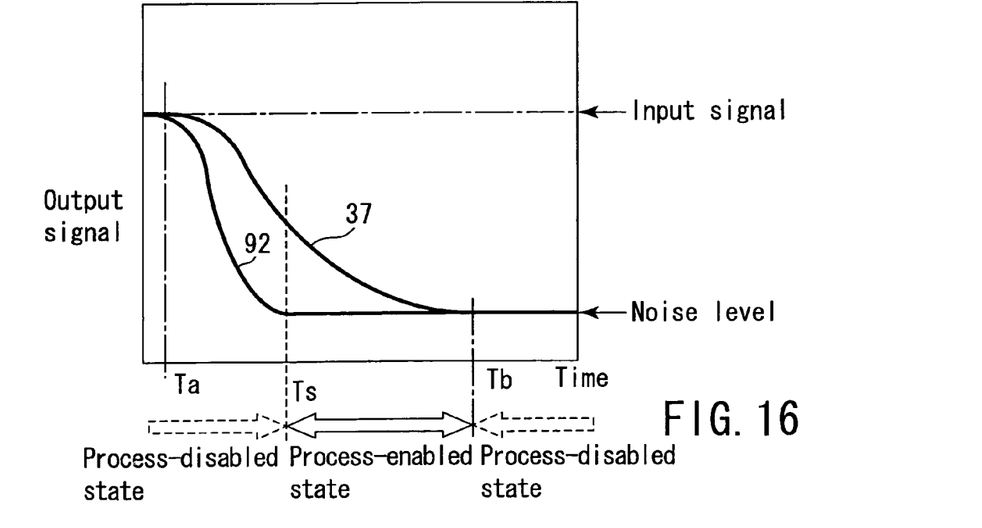
FIG. 16 is a graph illustrating the characteristics, i.e., changes in state with lapse of time, of timers 37 and 92.

FIG. 16 is a graph illustrating the characteristics (i.e., changes in state with lapse of time) of the timers 37 and 92 that are related to the above-described time management. As shown, when the timer 92 has measured a predetermined term (Ts), a state in which command processing can be performed is assumed. After that, until the timer 37 has measured a predetermined term, the command-processing enabled state is continued. When the timer 37 has measured the predetermined term (Tb), a state in which command processing cannot be performed is assumed.

In this modification, it is determined, using the two timers 37 and 92, whether or not a command from the IC card reader/writer 10 should be processed. However, this may be modified such that two command-processing programs are stored in the ROM of the control circuit 92 for each command supplied from the IC card reader/writer 10, and one of the two program that corresponds to the term including the command receiving time is executed. This enables various types of control.

The IC chip 22' according to the modification of the embodiment provides, as well as the above-mentioned advantages of the embodiment, the advantage that when a predetermined valid term is set, its start time can also be set.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A semiconductor integrated circuit driven by an external power, comprising:
   a change unit whose state changes with lapse of time without the external power, wherein the change unit includes a plurality of change elements, each of the change elements whose state changes with lapse of time without the external power;
   an output unit configured to output a signal in response to an instruction issued when the external power is supplied, the signal indicating a change of the state of the change unit; and
   an execution unit configured to execute a process in response to the signal.

2. The semiconductor integrated circuit according to claim 1, wherein the output unit includes a plurality of output elements, each of the output elements outputting the signal in response to the instruction.

3. The semiconductor integrated circuit according to claim 1, wherein the output unit includes a plurality of output elements, each of the output elements outputting the signal in response to the instruction.

4. The semiconductor integrated circuit according to claim 1, further comprising a control unit configured to acquire time information based on the signal when the external power is supplied, and control the execution unit to execute the process using the time information.

5. The semiconductor integrated circuit according to claim 4, wherein the output unit includes a plurality of output elements, each of the output elements outputting the signal in response to the instruction.

6. The semiconductor integrated circuit according to claim 4, wherein the change unit includes a plurality of change elements, each of the change elements whose state changes with lapse of time without the external power.

7. The semiconductor integrated circuit according to claim 6, wherein the output unit includes a plurality of output elements, each of the output elements outputting the signal in response to the instruction.

8. The semiconductor integrated circuit according to claim 4, further comprising:
   an antenna connection unit connected to an antenna and configured to acquire a current induced in the antenna by electromagnetic induction; and
   a power supply connected to the antenna connection unit, the power supply acquiring the current, rectifying and smoothing a acquired current, and supplying a rectified and smoothed current to an interior of the semiconductor integrated circuit.

9. The semiconductor integrated circuit according to claim 8, wherein
   the change unit includes a plurality of change elements, each of the change elements whose state changes with lapse of time without the external power, and
   the output unit includes a plurality of output elements, each of the output elements outputting the signal in response to the instruction issued when the external power is supplied.

10. The semiconductor integrated circuit according to claim 8, further comprising:
    a demodulation unit configured to demodulate a command superposed on the acquired current and output the command to the control unit, the demodulation unit being connected to the antenna connection unit; and
    a modulation unit configured to modulate a result of the process and output a modulated result to the antenna.

11. The semiconductor integrated circuit according to claim 1, further comprising:
    an antenna connection unit connected to an antenna and configured to acquire a current induced in the antenna by electromagnetic induction; and
    a power supply connected to the antenna connection unit, the power supply acquiring the current, rectifying and smoothing a acquired current, and supplying a rectified and smoothed current to an interior of the semiconductor integrated circuit.

12. The semiconductor integrated circuit according to claim 11, wherein
    the change unit includes a plurality of change elements, each of the change elements whose state changes with lapse of time without the external power, and
    the output unit includes a plurality of output elements, each of the output elements outputting the signal in response to the instruction.

13. The semiconductor integrated circuit according to claim 11, further comprising:
    a control unit configured to control the execution unit to execute the process based on the signal;
    a demodulation unit configured to demodulate a command superposed on the acquired current and output the command to the control unit, the demodulation unit being connected to the antenna connection unit; and a modulation unit configured to modulate a result of the process and output a modulated result to the antenna.

14. A semiconductor integrated circuit module comprising:
a semiconductor integrated unit including:
a power supply which acquires a current from an antenna, and rectifies and smoothes a acquired current, and supplying, as a power, a rectified and smoothed current to an interior of the semiconductor integrated unit;
a change unit whose state changes with lapse of time without the power;
an output unit configured to output a signal in response to an instruction issued when the power supply supplies the power, the signal indicating a change of the state of the change unit; and
an execution unit configured to execute a process in response to the signal;
a sealing material which seals the semiconductor integrated unit; and
an antenna terminal which connects the power supply to the antenna, the antenna terminal being exposed on an outer surface of the sealing material.

15. The semiconductor integrated circuit module according to claim 14, wherein the output unit includes a plurality of output elements, each of the output elements outputting the signal in response to the instruction when the power is supplied.

16. The semiconductor integrated circuit module according to claim 14, wherein the semiconductor integrated unit further includes:
a control unit configured to control the execution unit to execute the process based on the signal;
a demodulation unit configured to demodulate a command superposed on the acquired current and output the command to the control unit, the demodulation unit being connected to the antenna terminal; and
a modulation unit configured to modulate a result of the process and output a modulated result to the antenna.

17. The semiconductor integrated circuit module according to claim 14, further comprising a control unit configured to acquire time information based on the signal, and control the execution unit to execute the process using the time information.

18. The semiconductor integrated circuit module according to claim 17, wherein the output unit includes a plurality of output elements, each of the output elements outputting the signal in response to the instruction when the power is supplied.

19. The semiconductor integrated circuit module according to claim 17, wherein the semiconductor integrated unit further includes:
a control unit configured to control the execution unit to execute the process based on the signal;
a demodulation unit configured to demodulate a command superposed on the acquired current and output the command to the control unit, the demodulation unit being connected to the antenna terminal; and
a modulation unit configured to modulate a result of the process and output a modulated result to the antenna.

20. An information apparatus comprising:
an antenna which acquires a current induced by electromagnetic induction;
a power supply connected to the antenna, the power supply acquiring a current, rectifying and smoothing the acquired current, and supplying, as a power, a rectified and smoothed current to an interior of the information apparatus;
a change unit whose state changes with lapse of time without the power from the power supply, wherein the change unit includes a plurality of change elements, each of the change elements whose state changes with lapse of time without power;
an output unit configured to output a signal in response to an instruction issued when the power supply supplies the power, the signal indicating a change of the state of the change unit; and
an execution unit configured to execute a process in response to the signal.

21. The information apparatus according to claim 20, wherein
the output unit includes a plurality of output elements, each of the output elements outputting the signal in response to the instruction when the power is supplied.

22. The information apparatus according to claim 20, further comprising:
a control unit configured to control the execution unit to execute the process based on the signal;
a demodulation unit configured to demodulate a command superposed on the acquired current and output the command to the control unit, the demodulation unit being connected to the antenna; and
a modulation unit configured to modulate a result of the process and output a modulated result to the antenna.

23. The information apparatus according to claim 20, further comprising a control unit configured to acquire time information based on the signal, and control the execution unit to execute the process using the time information.

24. The information apparatus according to claim 23, wherein
the change unit includes a plurality of change elements, each of the change elements whose state changes with lapse of time without the power, and
the output unit includes a plurality of output elements, each of the output elements outputting the signal in response to the instruction issued when the power is supplied.

25. The information apparatus according to claim 23, further comprising:
a control unit configured to control the execution unit to execute the process based on the signal;
a demodulation unit configured to demodulate a command superposed on the acquired current and output the command to the control unit, the demodulation unit being connected to the antenna; and
a modulation unit configured to modulate a result of the process and output a modulated result to the antenna.

* * * * *